United States Patent [19]

Sieger et al.

[11] 4,036,626

[45] July 19, 1977

[54] METALLIC SEAL FOR PREVENTING TIN LEAKS IN A FLOAT GLASS FURNACE

[75] Inventors: John S. Sieger, Glenshaw; Joseph A. Gulotta, New Kensington, both of Pa.

[73] Assignee: PPG Industries, Inc., Pittsburgh, Pa.

[21] Appl. No.: 687,568

[22] Filed: May 18, 1976

[51] Int. Cl.² .......................................... C03B 18/02
[52] U.S. Cl. ................................. 65/182 R; 65/32; 65/374 M
[58] Field of Search ............ 65/32, 374 M, 374 RM, 65/182 R

[56] References Cited

U.S. PATENT DOCUMENTS

| 3,652,250 | 3/1972 | Brichard | 65/182 R |
| 3,898,069 | 8/1975 | Cerutti et al. | 65/182 R |

*Primary Examiner*—Arthur D. Kellogg
*Attorney, Agent, or Firm*—E. Kears Pollock

[57] ABSTRACT

A tin alloying metal seal is employed at refractory joints about the bottom of a float glass forming chamber for containing molten tin upon which glass can be formed in order to prevent leakage of tin through interstices in the refractory, or between refractory pieces, by forming an alloy with molten tin reaching the metal seal which has a substantially higher melting point than tin.

12 Claims, 1 Drawing Figure

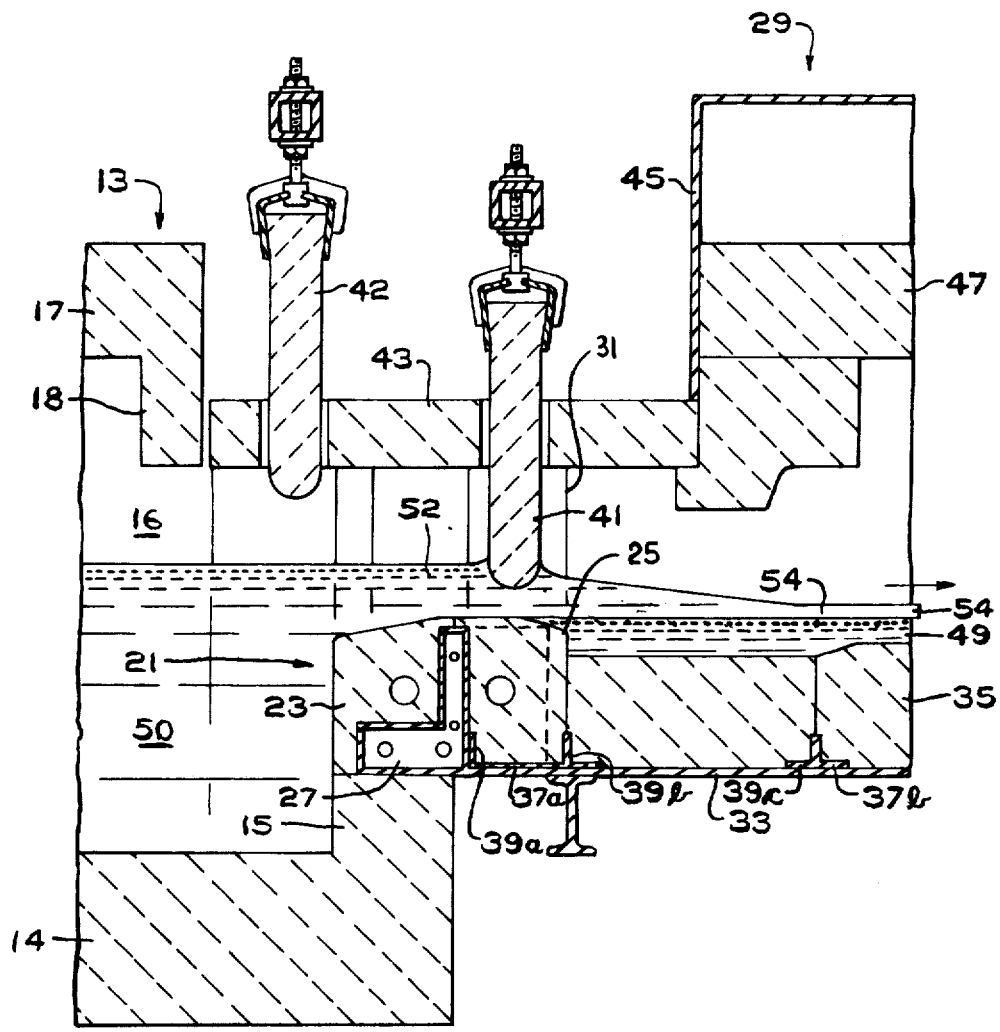

METALLIC SEAL FOR PREVENTING TIN LEAKS IN A FLOAT GLASS FURNACE

BACKGROUND OF THE INVENTION

The present invention relates to an apparatus for manufacturing flat glass wherein the glass is formed while being supported on a surface of a pool of molten tin following delivery thereto as molten glass. More particularly, this invention relates to a combination of elements comprising a container for holding such a pool of molten tin with reduced threat of leakage.

BRIEF DESCRIPTION OF THE PRIOR ART

It is known that molten glass can be delivered onto a pool of molten metal such as tin and formed into a continuous sheet of glass, according to the teachings of Heal, U.S. Pat. No. 710,357; of Hitchcock, U.S. Pat. No. 789,911; of Pilkington, U.S. Pat. Nos. 3,083,551 and 3,220,816 and of Edge and Kunkle, U.S. Pat. No. 3,843,346. According to the prior art, molten glass is delivered onto molten metal contained in a generally refractory container.

According to the disclosure of Hitchcock in U.S. Pat. No. 1,564,240, molten metal upon which glass is to be formed may be contained within a forming chamber comprising a metal casing. As described in U.S. Pat. Nos. 3,854,475 and 3,594,147 to Galey and Sensi, the metal casing may be provided with a refractory liner. Another refractory-lined metal casing structure is shown and described in U.S. Pat. No. 3,584,477 to Hainsfurther.

The bottom portion of a typical forming chamber which contains molten metal or tin on which glass is to be formed includes a bottom, side members and end members and is in the form of an open-top box. A top portion of a typical forming chamber includes top, sides, and ends which are sealed to the bottom portion in order to provide an enclosed forming chamber. In the construction of a forming chamber, it is general practice to construct a bottom casing of impervious metal plate, such as steel plates, by first constructing supports and then welding together plates to form the bottom casing which is in the form, as stated, of an open-top box. A refractory liner is constructed inside the bottom casing by either casting a lining in place or by placing many individual refractory pieces into the casing to form a complete liner. With either construction method there may be cracks through the refractory leading from the inside of the liner where molten tin is to be contained outwardly and downwardly to the casing itself. Particularly in the assemblies comprising a plurality of individual refractory pieces is this so. It is possible despite careful testing of welds that some small openings may exist through welded joints of the casing, and it is particularly possible during the initial heatup of a forming chamber that cracks may appear in the joints between plates forming a casing. It is therefore possible for tin leaks to occur from time to time forming chambers of conventional construction. It is the discovery of the applicants that such leaks may be avoided by the inclusion of particular metal elements in the combination.

SUMMARY OF THE INVENTION

Metal seals, preferably in the form of metal sheets or plates (including shim stock or foil), are provided between a forming member casing and its refractory liner near joints in the refractory liner. The seals are provided particularly in the upstream or hot end of the forming chamber. Metal seals are also provided between adjacent refractory pieces comprising the liner of the chamber, particularly near the bottom of such refractory pieces.

In the event that molten tin does leak or seep through interstices between refractory pieces of the bottom of a chamber liner, it comes into contact with this metal seal and further seepage or leakage is stopped. The metal seals may be made of any metal which reacts with tin to form a seal. Thus, the metal of the seal is one that is attacked by, or is readily alloyed with, tin to form a metal having a greater specific volume than the original metal and having a melting point higher than that of tin. By tin attack or by alloying, the metal swells to fill the joint or space it is to seal, and, since such attacked metals or alloys have melting points which are substantially higher than the melting point of the tin itself, the metals or alloys act to provide frozen seals preventing further leakage of tin.

In general, the alloying and swelling of the metal seal is enhanced by the presence of oxygen such as that in air. Therefore, it should be noted that were casings completely impervious to air leakage, the proposed sealing scheme would not be expected to work particularly well. But, since some air leakage into the casing-liner interspace and the liner interstices is expected for an ordinary glass forming chamber, the proposed metal seals will swell and seal to the extent that they are attacked by tin in the presence of oxygen. This is precisely the condition under which the sealing function is needed so that the present scheme is to be considered as a self-initiating and self-limiting method for sealing a forming chamber from inadvertent tin leakage.

At the time when a newly constructed or newly repaired glass forming chamber is started, it is heated and tin is loaded to it. The chamber contains air, both above and beneath its refractory liner. Residual air is likely to be present in the refractories, as well. Thus, during the initial operation of the chamber there will likely be more air present for assisting in swelling metal seals than after the forming chamber has attained steady state operating conditions. It is expected then that most sealing will occur as the first tentative molten tin leaks develop during startup and that the chamber liner can be completely sealed by the time it reaches steady state operating conditions.

Some metals which appear useful as metal seals are iron, nickel, and, to a limited extent, copper. Also many iron and nickel alloys are useful as metal seals. A mild steel, such as ordinary cold rolled steel, is a preferred metal seal material.

Since the bottom refractory liner of a glass forming chamber is already provided with a surrounding casing that is generally constructed of mild steel plate, it may appear odd that it would be of any added value to place metal sheet or plate (including foil or shim stock) in seams or joints between adjacent refractory pieces in the liner to prevent leaks by interaction with molten tin. However, it is not redundant to use the sealing technique described here for an interaction or alloying between molten tin and a sealing metal is useless to act as a seal unless the sealing metal swells to fill the interstice through which leakage could occur. In the practice of this invention a swelling of sealing metal fills the joint or seam in which it resides and compresses against the adjacent refractory pieces. Since all of the refractory pieces fill the bottom of the casing, the entire bottom assembly is likely to experience increased compression with the swelling of sealing metal in the vertical refractory joints.

The preferred metal seal materials are metals which react with tin at the operating temperatures of a glass forming bath and swell to 1.2 to 2.5 times their original thickness as measured after cooling to original ambient conditions. A convenient test for selecting materials is to hold sheets or plates of them in contact with molten tin at 500° C. for at least 48 hours as described in the examples which follow, remove them from contact and measure their thicknesses. Particularly preferred metal seal materials swell to from 1.5 to 1.8 times their original thickness when contacted by molten tin at 500° C. for more than 48 hours.

While the concept of the applicants is thought to provide particular benefits in preventing the leakage of molten tin from a glass forming chamber, the described metal seals should be effective to act as a sealant for sealing small openings of other refractory containers for containing molten tin whether involved in the making of glass or not.

This invention may be further understood with reference to the accompanying drawings.

BRIEF DESCRIPTION OF THE DRAWINGS

The drawing illustrates the upstream or hot end of a forming chamber according to the teachings of Edge and Kunkle wherein a stream or layer of molten glass is delivered along a substantially horizontal path from a glass melting, refining and conditioning furnace onto a pool of molten tin in an enclosed forming chamber. The drawing illustrates the placement of metal seals in plate, sheet or foil form between the chamber casing and its refractory liner.

DESCRIPTION OF THE PREFERRED EMBODIMENTS

Referring now to the drawing, there is shown a preferred embodiment of this invention. At the downstream end of a glass tank or furnace 13, a threshold 21 comprising refractory blocks 23 and 25 mounted on a cooler 27 extends across the inlet or upstream end of a forming chamber 29. At the ends of threshold 21 are jambs 31 which define the sides of an opening through which molten glass may be delivered for forming. Extending beneath the threshold 21 and also beneath the forming chamber 29 is a casing 33, preferably a steel casing, and inside that bottom casing 33 extending from adjacent to the threshold 21 on through the forming chamber 29 is a refractory liner 35. Between the refractory liner 35 and the casing 33 is a metal seal comprising a thin layer or plates of mild steel 37a and 37b, and other plates of mild steel 39a, b and c extend upwardly some distance from the casing between adjacent refractory pieces.

Above the threshold 21 there is a metering member or tweel 41 and a roof portion or flat arch 43 which is joined with an upper casing 45 for the forming chamber 29 with a chamber roof or ceiling 47 overlying the bottom portion of the chamber. Contained within the bottom portion of the chamber is a pool of molten tin 49 and contained within the glassmaking furnace 13 is a pool of molten glass 50. During operation, a stream of molten glass 52 is continuously delivered over the threshold 21, between jambs 31, beneath the tweel 41 and, as an advancing layer 54 of molten glass, onto the pool of molten tin 49 contained in the bottom of the forming chamber 29. The glass 54 is thereafter cooled and advanced along the surface of the pool of molten tin 49 until it forms a dimensionally stable, continuous sheet of glass which is then lifted from the pool of molten tin 49 and conveyed out from the enclosed forming chamber 29 to an annealing lehr (not shown) for further treatment.

The sealing qualities of the selected metal seals may be demonstrated by simple experiment as shown in the following examples.

EXAMPLE I

A refractory crucible having a diameter of 4 inches (10.2 centimeters) and an outside height of 3 inches (7.6 centimeters) with a bottom thickness of 1 inch (2.5 centimeters) is provided with a slot through its bottom having a length of 1⅛ inch and a width of 1/16 inch (28.6 × 1.6 millimeters). A piece of cold rolled steel 1⅜ inch × 1⅛ inch × 0.060 inch (35 millimeters × 28.6 millimeters × 1.5 millimeters) is placed in the slot. The edges of the slot and the steel plate are sufficiently rough so that light may be seen through the slot all about the plate. By chemical analysis the plate is 99.24 percent iron. By semi-quantitative emission spectrographic analysis, it further comprises greater than 0.1 percent manganese, greater than 0.01 percent and less than 0.1 percent silicon, greater than 0.005 percent and less than 0.05 percent molybdenum, greater than 0.006 percent and less than 0.06 percent chromium and a trace of magnesium, aluminum and copper.

The crucible is partially filled with tin as 635 grams of tin is placed in it. The crucible has a lid placed on it and is then placed in a hot muffle furnace on a refractory holder resting in a tray. The furnace has an air atmosphere and is maintained at about 500° C. After about one hour the crucible and tray are observed; no tin has leaked from the crucible. The crucible is observed again after one day, after four days and after five days of being maintained at 500° C.; no tin leakage is observed. The furnace temperature is lowered and the crucible removed. The tin is observed to have a moderate scum which is removed and the tin is poured from the crucible.

The plate is removed from the slot with difficulty and is observed as being noticeably swelled where it extended through the slot into contact with the tin. The plate has a thickness of 0.062 inch (1.57 millimeters) in that portion wholly in the slot of the crucible during the test and a thickness of 0.064 inch (1.63 millimeters) at about the location of insertion into the bottom of the crucible. Its thickness just below the original tin contact portion (inside the slot itself during the test) is now 0.091 inch (2.31 millimeters) and its thickness in its tin contact portion ranges from 0.110 inch to 0.112 inch (2.79 millimeters to 2.84 millimeters). It is noticeably attacked where it had been contacted by molten tin.

EXAMPLE II

A test similar to Example I is performed. The equipment is similar to that of the previous example. Two pieces of nickel, each about 0.020 to 0.025 inch thick (0.51 – 0.64 millimeter) are placed in a slot in the bottom of a test crucible and 630 grams of tin is placed in the crucible.

The crucible is placed on a tray in a hot muffle furnace. It is maintained at about 500° C and after four days no tin leakage is observed. After removal and cooling of the crucible, it is necessary to cut the crucible and pieces of nickel across the plane of the slot to observe the condition of the nickel pieces. The nickel pieces are partially dissolved where they extended into the tin. They are swollen just inside the slot from the inside of the crucible and are sealed outwardly against the slot there.

EXAMPLE III

A test similar to Example II is performed. The equipment is similar to that in the previous example except that the slot is partially filled with copper shims. Eighteen copper shims, each 1 inch square (2.5 centimeters × 2.5 centimeters) and 0.0015 inch (0.038 millimeter) thick, are placed in the slot so that a small hole about 1/32 inch (0.8 millimeter) across is visible at one end of the slot. It is possible to see through this hole and the shims are placed in the slot to protrude ¼ to ⅜ inch (6.3 to 9.5 millimeters) above the inside of the crucible. One hundred fifty grams of tin is placed in the crucible and it is placed in a muffle furnace with a lid on the crucible and the muffle furnace having an air atmosphere. The furnace is set to heat to 300° C. After an hour there is no molten tin observed in the tray and 170 grams of tin is added to the crucible. After two hours, there is still no molten tin observed in the tray and 250 grams of tin is added to the crucible. After 22 hours there still is no molten tin observed in the tray and heating of the muffle furnace is increased in order to raise its temperature to 500° C. The temperature of the muffle furnace is maintained at about 500° C. for an hour and no molten tin is observed in the tray. The muffle furnace is maintained at about 500° C. for about 50 hours and there is still no molten tin observed in the tray. Thus, it may be seen that the metal seal acts to prevent leakage of molten tin from the refractory container even though the metal sealant does not completely fill an opening through which molten tin might otherwise flow. In part, this may be due to surface tension effect. Since little attack or swelling is noted when copper is used as a metal seal, it is suspected that copper is less effective as a metal seal than iron or steel.

EXAMPLE IV

A test similar to Example I is performed in a reducing atmosphere. A piece of mild steel 1¼ inch × 1⅜ inch × 0.059 inch (31 millimeters × 35 millimeters × 1.5 millimeters) is placed in a slot in the bottom of a crucible with ⅜ inch of the piece extending into the crucible and one inch protruding out of it. Light is visible about the piece of steel through the slot.

The assembly is placed in a furnace with tin in the crucible which rests on refractory blocks in a tray. The furnace is purged repeatedly to establish an atmosphere in it comprising 7 percent by volume hydrogen and the remainder nitrogen. Hydrogen and nitrogen are fed to the furnace to maintain such an atmosphere during the test.

The furnace is heated to about 475° C. (890° F.). After five days tin is observed to have leaked through the slot. The crucible is then removed from the furnace and the steel piece examined. The steel has a partially "tinned" appearance and appears to have been partially attacked by the tin even in the reducing atmosphere. The thickness of the steel in the slot is now about 0.064 to 0.068 inch (about 1.7 millimeters) which indicates some swelling of the metal, but, as indicated by the leakage, an insufficient swelling to completely stop the loss of tin.

This test taken together with those previously described appear to indicate that it is important for some oxygen (air) to reach the refractory-casing interspace to assist in sealing interstitial tin leaks by aiding in the swelling of reactive metal seals when contacted by the tin. Since casings, although generally impervious, are usually not perfectly sealed against air ingress, it is believed that sufficient oxygen will generally be present to assist the sealing function of reactive metal seals in the manner described.

While this invention has been described with reference to particular embodiments thereof, those skilled in the art will recognize that other materials and compositions may be selected for use as metal seals without departing from the spirit of this invention.

We claim:

1. In an apparatus for forming flat glass comprising an enclosed chamber which includes a metal casing having a refractory liner disposed therein for containing a pool of molten metal consisting essentially of tin wherein the refractory liner comprises a plurality of refractory pieces having joints between adjacent pieces, which joints provide communication between the pool of molten metal and the casing, the improvement which comprises metal seals located inside the casing in the vicinity of at least some of the refractory liner joints, extending into the joints and contacting each refractory piece adjacent thereto for preventing the leakage of molten tin therethrough, said metal seals comprising metal which reacts with molten tin causing the metal to swell pressing against the contacted refractory pieces, the metal of each metal seal having a melting point greater than the melting point of tin.

2. The apparatus according to claim 1 wherein the metal seals comprise pieces of metal sheet or plate disposed in the vertical refractory joints in the liner at least adjacent an inlet end of the chamber where molten glass is delivered to it.

3. The apparatus according to claim 2 wherein the metal seals comprise metal sheet or plate containing iron, nickel or copper.

4. The apparatus according to claim 3 wherein the metal seals comprises metal sheet or plate containing iron.

5. The apparatus according to claim 2 wherein the metal seals extend only partially upwardly in the vertical refractory joints from the bottom of the refractory liner.

6. The apparatus according to claim 2 further comprising pieces of metal sheet or plate disposed beneath the vertical refractory joints between the refractory liner and the casing.

7. The apparatus according to claim 6 wherein the pieces of sheet or plate disposed between the refractory liner and the casing contain iron, nickel or copper.

8. The apparatus according to claim 1 wherein the metal seal comprises a metal which reacts with tin at a temperature on the order of 500° C. to swell to a thickness of from 1.2 to 2.5 of its original thickness.

9. The apparatus according to claim 1 wherein the metal seal comprises a metal which reacts with tin at a temperature on the order of 500° C. to swell to a thickness of from 1.5 to 1.8 of its original thickness.

10. The apparatus according to claim 9 wherein the metal seal comprises an iron-containing metal.

11. The apparatus according to claim 1 wherein at least one metal seal has a swelled portion between adjacent refractory pieces which compresses against each of them.

12. The apparatus according to claim 11 wherein the sealing having a swelled portion is substantially iron and its swelled portion is from 1.2 to 2.5 the thickness of its thickness where not swelled.

* * * * *